(12) United States Patent
Ortmann et al.

(10) Patent No.: US 11,163,301 B2
(45) Date of Patent: Nov. 2, 2021

(54) METHOD FOR OPERATING A SELF-TRAVELING FLOOR TREATMENT APPARATUS

(71) Applicant: Vorwerk & Co. Interholding GmbH, Wuppertal (DE)

(72) Inventors: Roman Ortmann, Huerth (DE); Gerhard Isenberg, Cologne (DE)

(73) Assignee: Vorwerk & Co. Interholding GmbH, Wuppertal (DE)

( * ) Notice: Subject to any disclaimer, the term of this patent is extended or adjusted under 35 U.S.C. 154(b) by 17 days.

(21) Appl. No.: 15/920,661

(22) Filed: Mar. 14, 2018

(65) Prior Publication Data
US 2018/0267528 A1 Sep. 20, 2018

(30) Foreign Application Priority Data
Mar. 16, 2017 (DE) ...................... 10 2017 105 724.2

(51) Int. Cl.
| | | |
|---|---|---|
| *G05D 1/00* | (2006.01) | |
| *A47L 11/40* | (2006.01) | |
| *G05D 1/02* | (2020.01) | |

(52) U.S. Cl.
CPC ........ *G05D 1/0038* (2013.01); *A47L 11/4094* (2013.01); *G05D 1/0016* (2013.01); *G05D 1/0088* (2013.01); *G05D 1/0227* (2013.01); *A47L 2201/04* (2013.01); *G05D 2201/0203* (2013.01); *G05D 2201/0215* (2013.01)

(58) Field of Classification Search
CPC .. G05D 1/0038; G05D 1/0088; G05D 1/0016; G05D 1/0227; G05D 2201/0215; G05D 2201/0203; G05D 1/0061; G05D 1/0246; G05D 1/0033; A47L 11/4094; A47L 2201/04; A47L 11/4061; A47L 11/4066; A47L 2301/08; B25J 9/00; B25J 13/00; B60W 60/0018; B60W 60/00182; B60W 60/00186; B60W 60/00184; B60W 60/005; B60W 60/0053; B60W 60/0061; B60W 2540/045; B60W 2556/45;
(Continued)

(56) References Cited

U.S. PATENT DOCUMENTS 5,369,347 A * 11/1994 Yoo ...................... A47L 11/4005
318/568.12
5,920,172 A * 7/1999 Bauer ................... G05D 1/0212
318/568.12
(Continued)

FOREIGN PATENT DOCUMENTS

WO 01/84260 A2 11/2001
WO 2015/183005 A1 12/2015

*Primary Examiner* — Angelina Shudy
*Assistant Examiner* — Mohamed Abdo Algehaim
(74) *Attorney, Agent, or Firm* — Collard & Roe, P.C.

(57) ABSTRACT

In a method for operating a self-traveling floor treatment apparatus, a recording device of the floor treatment apparatus records a recording of an environment of the floor treatment apparatus, which concerns a time period, and the recording is displayed for a user of the floor treatment apparatus on a screen. In order to allow correction of error conditions, the recording is stored and, in case of a defined environmental event and/or apparatus condition of the floor treatment apparatus, a time-defined partial sequence is subsequently extracted from the stored recording and displayed on the screen.

8 Claims, 4 Drawing Sheets

(58) Field of Classification Search
CPC ........... B60W 2050/146; B60W 50/08; B60W 50/10; B60W 50/14
USPC ................ 701/2; 715/736, 726; 340/407
See application file for complete search history.

(56) References Cited

U.S. PATENT DOCUMENTS

| | | | | |
|---|---|---|---|---|
| 7,647,144 B2* | 1/2010 | Haegermarck | .......... | A47L 9/009 15/319 |
| 9,457,471 B2* | 10/2016 | Schnittman | .......... | G05D 1/0227 |
| 9,511,494 B2* | 12/2016 | Noh | .......... | B25J 9/1676 |
| 9,704,043 B2* | 7/2017 | Schnittman | .......... | B25J 5/00 |
| 9,750,382 B2* | 9/2017 | Kim | .......... | A47L 9/2894 |
| 9,791,840 B2* | 10/2017 | Michelon | .......... | E04H 4/1654 |
| 9,820,625 B2* | 11/2017 | T P | .......... | A47L 9/2826 |
| 10,143,349 B2* | 12/2018 | Kim | .......... | A47L 9/2894 |
| 10,144,342 B2* | 12/2018 | Ji | .......... | B60R 1/00 |
| 2001/0037163 A1* | 11/2001 | Allard | .......... | B25J 9/1689 700/245 |
| 2011/0077802 A1* | 3/2011 | Halloran | .......... | A47L 5/30 701/2 |
| 2012/0185115 A1* | 7/2012 | Dean | .......... | F41H 7/005 701/2 |
| 2012/0265391 A1* | 10/2012 | Letsky | .......... | A01D 34/008 701/25 |
| 2013/0056032 A1* | 3/2013 | Choe | .......... | A47L 9/0488 134/18 |
| 2013/0190963 A1* | 7/2013 | Kuss | .......... | B66F 9/063 701/23 |
| 2013/0204463 A1* | 8/2013 | Chiappetta | .......... | G05D 1/0225 701/2 |
| 2013/0278769 A1* | 10/2013 | Nix | .......... | H04N 7/18 348/148 |
| 2013/0326839 A1* | 12/2013 | Cho | .......... | A47L 9/2805 15/319 |
| 2014/0249695 A1* | 9/2014 | Gettings | .......... | G05D 1/0022 701/2 |
| 2015/0057800 A1* | 2/2015 | Cohen | .......... | A47L 9/2857 700/258 |
| 2015/0120056 A1* | 4/2015 | Noh | .......... | G05D 1/024 700/259 |
| 2015/0128547 A1* | 5/2015 | Einecke | .......... | A01D 34/008 56/10.2 A |
| 2015/0142250 A1* | 5/2015 | Cavender-Bares | .......... | A01C 7/00 701/23 |
| 2015/0217449 A1* | 8/2015 | Meier | .......... | G06N 3/008 700/257 |
| 2016/0147230 A1* | 5/2016 | Munich | .......... | G05D 1/0246 701/28 |
| 2016/0167234 A1* | 6/2016 | Angle | .......... | H04L 67/125 701/2 |
| 2016/0227200 A1* | 8/2016 | Reitterer | .......... | H04N 13/349 |
| 2017/0090480 A1* | 3/2017 | Ho | .......... | G05D 1/0027 |
| 2017/0206418 A1* | 7/2017 | Schnittman | .......... | B25J 5/00 |
| 2017/0212523 A1* | 7/2017 | Witelson | .......... | E04H 4/1654 |
| 2017/0332869 A1* | 11/2017 | Nam | .......... | A47L 11/33 |
| 2018/0050634 A1* | 2/2018 | White | .......... | A47L 9/2805 |
| 2019/0298139 A1* | 10/2019 | Takaoka | .......... | A47L 9/2852 |
| 2019/0332119 A1* | 10/2019 | Kim | .......... | G06K 9/00805 |
| 2020/0012292 A1* | 1/2020 | Park | .......... | G05D 1/0253 |
| 2020/0047337 A1* | 2/2020 | Williams | .......... | B25J 9/163 |
| 2021/0034062 A1* | 2/2021 | Ahn | .......... | A47L 11/282 |

\* cited by examiner

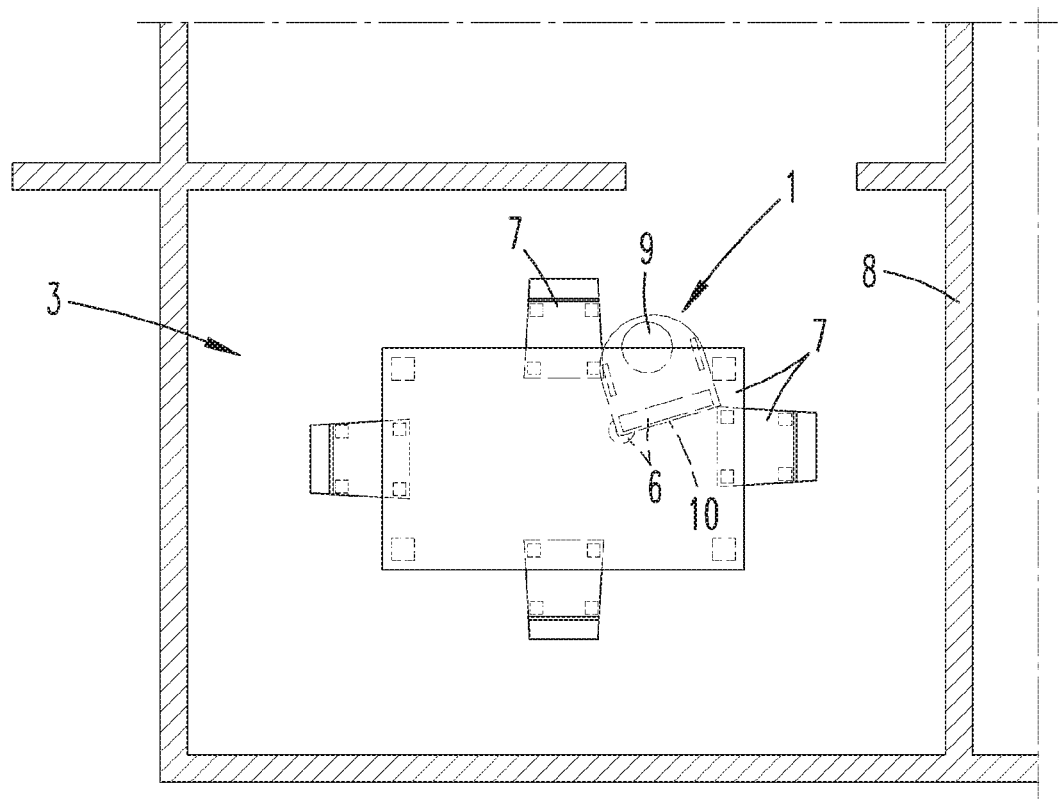

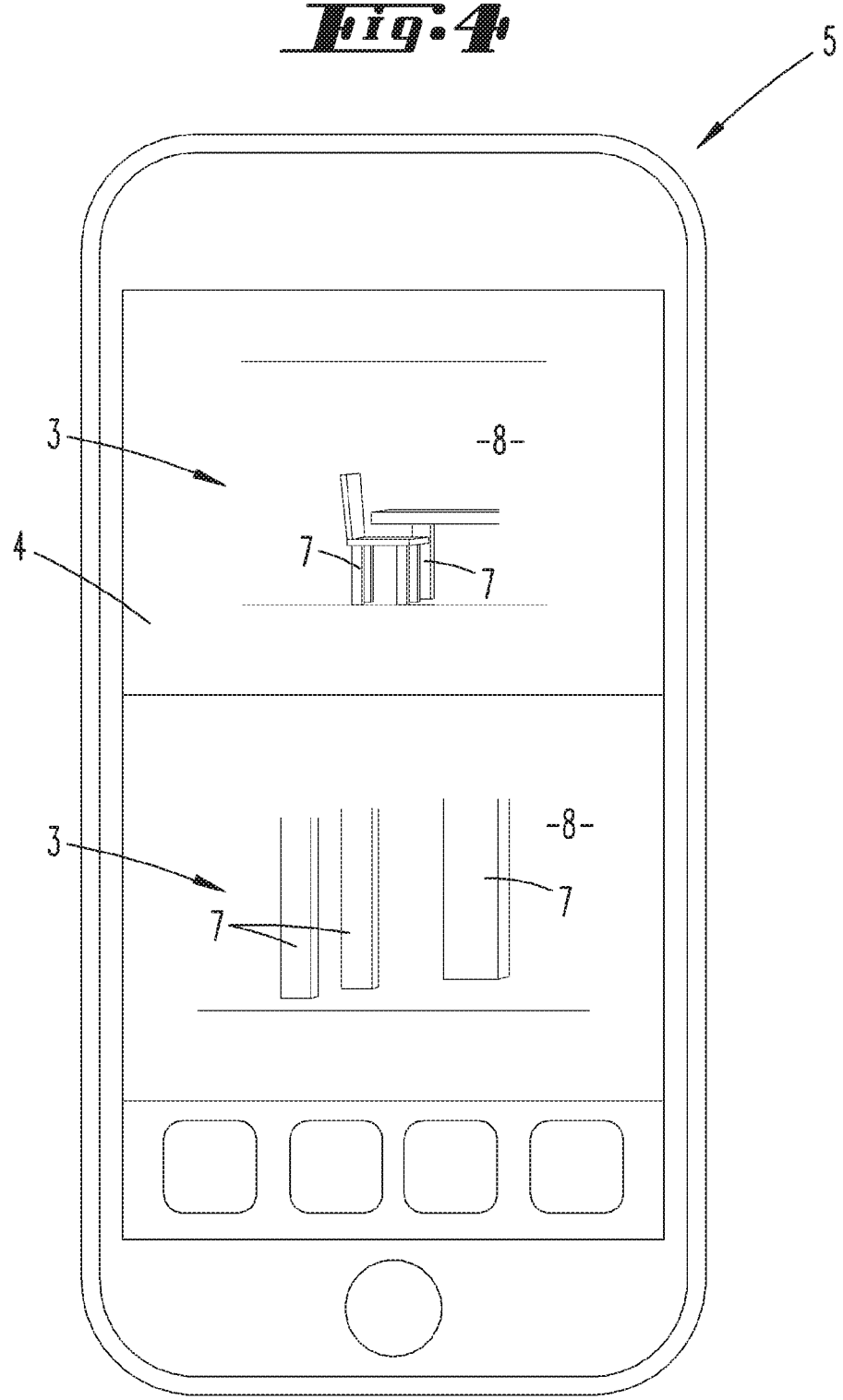

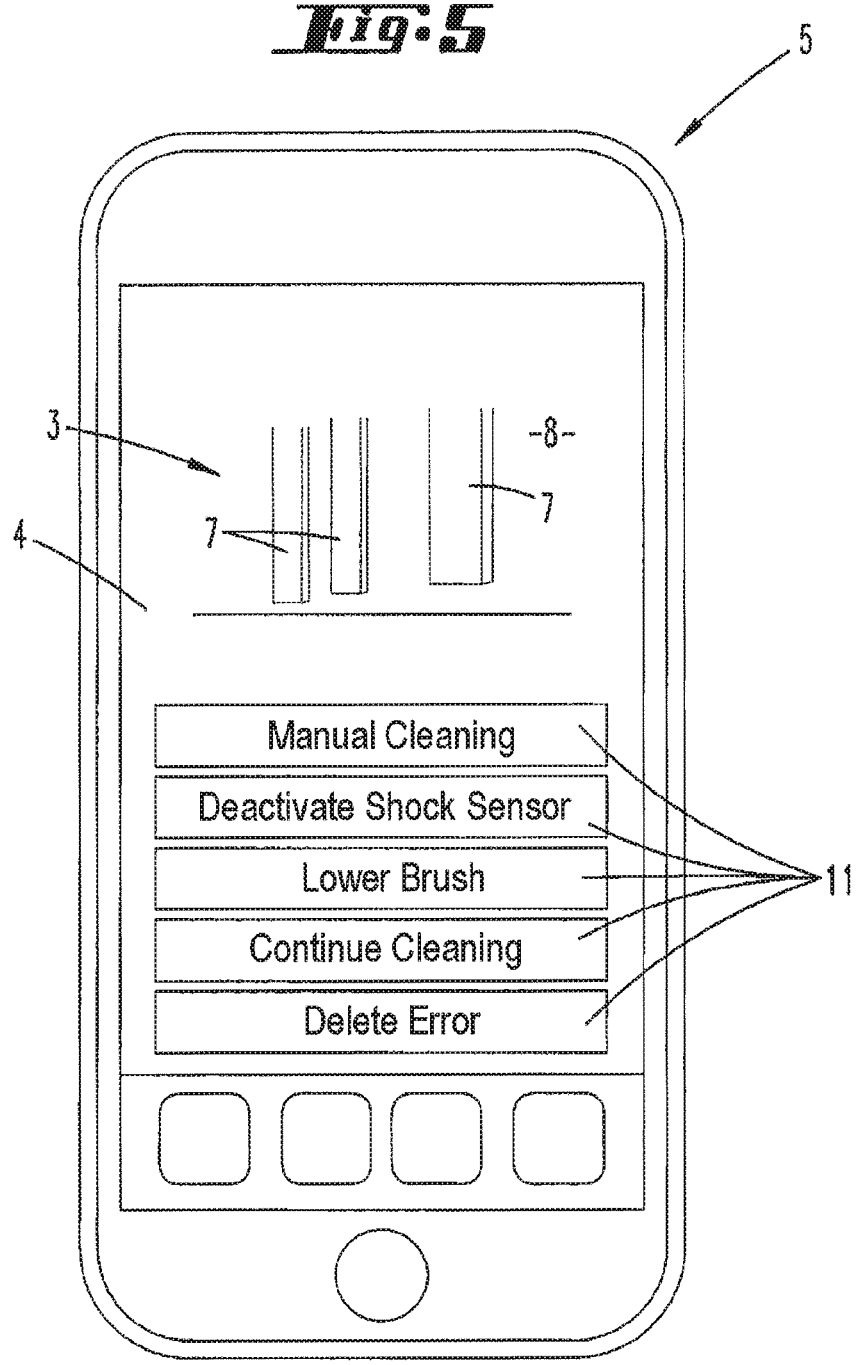

METHOD FOR OPERATING A SELF-TRAVELING FLOOR TREATMENT APPARATUS

CROSS REFERENCE TO RELATED APPLICATIONS

Applicant claims priority under 35 U.S.C. § 119 of German Application No. 10 2017 105 724.2 filed Mar. 16, 2017, the disclosure of which is incorporated by reference.

TECHNICAL FIELD

The invention pertains to a method for operating a self-traveling floor treatment apparatus, wherein a recording device of the floor treatment apparatus records a recording of an environment of the floor treatment apparatus, which concerns a time period, and wherein the recording is displayed for a user of the floor treatment apparatus on a screen.

The invention furthermore pertains to a self-traveling floor treatment apparatus with a recording device for recording a recording of an environment of the floor treatment apparatus, which concerns a time period, and with an evaluation and control unit for storing the recording.

PRIOR ART

Floor treatment apparatuses and methods for their operation are known from the prior art. The recording device of the floor treatment apparatus consists, for example, of a camera that records image sequences and/or videos of the environment of the floor treatment apparatus. The recordings are displayed, for example, on a screen of the floor treatment apparatus or of an external device such as a PC or a mobile device.

For example, publication WO 01/84260 A2 discloses a mobile robot with an intuitive user interface for remotely controlling the robot. The user can specify a target area within the environment, to which the mobile robot should travel, by means of a touch screen. The mobile robot features a camera for recording the environment.

Furthermore, publication WO 2015/183005 A1 discloses a mobile cleaning apparatus with an image acquisition device and a screen for displaying a recording of the image acquisition device, wherein the screen can detect a touch and the control unit controls a motion of the mobile apparatus to the selected location depending on the detected touch.

During the operation of such mobile apparatuses, it can occur that they get stuck in the environment, e.g. jammed between obstacles, and can no longer dislodge themselves from this situation without the assistance of the user.

SUMMARY OF THE INVENTION

Based on the above-described prior art, the invention aims to develop a method for operating a self-traveling floor treatment apparatus, in which particularly a correction of error conditions of the floor treatment apparatus, e.g. getting stuck in the environment, is simplified.

In order to attain the above-defined objective, the invention proposes that the recording is stored and, in case of a defined environmental event and/or apparatus condition of the floor treatment apparatus, a time-defined partial sequence is subsequently extracted from the stored recording and displayed on the screen.

According to the invention, an image sequence consisting of multiple images and/or a video, which respectively shows the environment of the floor treatment apparatus, for example, during a progressive motion thereof, is recorded over a time period. The image sequence and/or the video is stored and, if necessary, used for evaluating an error condition of the floor treatment apparatus, e.g. for obtaining information on the situation, to which the floor treatment apparatus was exposed prior to an error condition. For this purpose, a partial sequence containing a certain time segment prior to the occurrence of the error condition is extracted from the stored recording. This partial sequence is displayed on a screen such that the user can view and, if applicable, analyze the time segment prior to the occurrence of the error in order to rectify the error condition. For example, it can occur that a floor treatment apparatus such as a domestic robot gets stuck during a work cycle, e.g. underneath a piece of furniture such as a bed, a sofa, a chest or the like, on a threshold or at a location that is difficult to access due to obstacles. The recording device of the floor treatment apparatus, particularly a camera, records a recording of the environment of the floor treatment apparatus during the work cycle, preferably in the direction of travel. The recording may consist of individual images, which are then assembled into an image sequence, or of a video. The recording is stored in a memory area within the robot, on an Internet server or on a storage device that can be reached via a wireless network, wherein the recordings preferably are periodically overwritten or deleted in order to reduce the required memory capacity. It is important that recordings exist at least of a time period, which provides information on the origin of an error condition of the floor treatment apparatus. If an error condition occurs, a time-defined partial sequence of the recording is extracted and displayed on the screen such that a user of the floor treatment apparatus gets an optical impression of the situation of the floor treatment apparatus shortly before the occurrence of the error condition. This enables the user to evaluate the operation of the floor treatment apparatus, particularly also its progressive motion, and to obtain information on the cause of the error condition. The user does not have to constantly monitor the floor treatment apparatus during its operation, but rather can obtain information on the preceding situation purposefully, i.e. when an error condition actually occurs. For example, the time-defined partial sequence may comprise a time segment of up to 60 seconds prior to the occurrence of the error condition such that the user is provided with information on what happened within the last 60 seconds prior to the occurrence of the error condition. In this way, the user can find out, for example, how the floor treatment apparatus ended up in a situation that ultimately resulted in getting stuck between obstacles. It is naturally also possible to respectively extract longer or older partial sequences.

The defined apparatus condition, in individual instances also a defined environmental event, particularly occurs when the planned progressive motion of the self-traveling floor treatment apparatus is interrupted or stopped. The self-traveling floor treatment apparatus usually follows a precalculated route, which is calculated, e.g., based on a stored map or a measurement of the environment. However, it is also possible that the progressive motion takes place without a precalculated route, e.g. in the form of a progressive motion until the detection of or a collision with the next obstacle takes place, whereupon the apparatus may, for example, routinely reverse its motion and/or rotate in order to subsequently initiate a new forward motion.

In this context, the defined apparatus condition described above may also consist of different events or circumstances. The floor treatment apparatus also can no longer carry out its progressive motion if the wheels can no longer transfer any force to the ground. This can occur, for example, if there is no longer sufficient friction or if a driving wheel or, if applicable, multiple driving wheels rotate freely, i.e. no longer have ground adherence. It can also occur that the floor treatment apparatus can no longer carry out its progressive motion due to an entanglement in an obstacle such as carpet fringes or carries out a progressive motion that significantly deviates from the planned progressive motion. A significantly deviating progressive motion may also be an apparatus condition that can be subsequently extracted in the form of the time-defined partial sequence and displayed on the screen. In more general terms, it may be a circumstance that acts upon the floor treatment apparatus from outside or within and prevents a proper continuation of the preprogrammed behavior of the floor treatment apparatus.

The defined environmental event and/or the apparatus condition may particularly consist of jamming of the floor treatment apparatus in the environment, blocking of a driving wheel of the floor treatment apparatus, a battery status below a defined minimum value and/or a faulty software status. As soon as an evaluation and control unit of the floor treatment apparatus detects such an environmental event and/or such an apparatus condition, the extraction of the time-defined partial sequence is initiated and the partial sequence of the recording is displayed for the user on the screen. Environmental events or apparatus conditions other than those described above, which impede a smooth and automatic operation of the floor treatment apparatus, are naturally also conceivable. Due to the display of the partial sequence of the recording, the user can obtain information on how the floor treatment apparatus became jammed in the environment, e.g. between obstacles, why a driving wheel of the floor treatment apparatus is blocked, why the battery status shows an excessively low charge condition, e.g., earlier than expected and/or how a faulty software status manifests itself during the operation of the floor treatment apparatus. The defined environmental events or apparatus conditions, which lead to the display of a partial sequence on the screen, can either be defined by the user of the floor treatment apparatus or are predefined in the control and evaluation unit of the floor treatment apparatus by the manufacturer. The apparatus conditions may also be defined, e.g., as a condition of a floor treatment element or another accessory of the floor treatment apparatus such as a blocked condition of a cleaning brush, a blocked condition of a wheel, a no longer functioning sensor, damage to a housing part or the like.

It is proposed that the partial sequence is displayed on a screen of an external mobile device. The external device may consist, for example, of a mobile telephone, a laptop, a tablet PC, a local computer or the like. Consequently, the partial sequence is not displayed on a dedicated screen of the floor treatment apparatus, but rather remotely from the floor treatment apparatus on another device of the user. This external device preferably also makes it possible to remotely control the floor treatment apparatus. Due to the display on the external device, a user of the floor treatment apparatus can also obtain information on the current condition or the reason for the occurrence of an error condition when the user is currently not located in the environment of the floor treatment apparatus. In this case, the transmission of the partial sequence from the floor treatment apparatus to the external device can preferably take place via WLAN, Bluetooth, ZigBee or the like. If the external mobile device is not located in the same home network as the floor treatment apparatus, the transmission may also take place via the Internet, preferably via a server of the manufacturer of the floor treatment apparatus. In order to display the partial sequence on the screen of the external mobile device, it is recommended to install an application, which allows a purposeful retrieval of the partial sequence, on the external mobile device. In this case, the app can preferably be set in such a way that the display of a partial sequence is either initiated manually by the user or a partial sequence is always automatically displayed when an error condition of the floor treatment apparatus has occurred. In the first case, the user is informed of the occurrence of an error condition by the app of the external mobile device. The user can then decide whether or not the partial sequence should be displayed on the screen. In order to display the partial sequence, for example, the user has to input a corresponding request on the external mobile device, e.g. by pressing a button on its touchscreen.

It is proposed that the user remotely controls the floor treatment apparatus manually after the display of the partial sequence. After the user has obtained information on the environmental event or the apparatus condition of the floor treatment apparatus, particularly on the origin of the environmental event or the apparatus condition, the user controls the floor treatment apparatus manually in order to respectively correct or modify the environmental event or the apparatus condition in such a way that an undisturbed operation of the floor treatment apparatus is possible. The remote control is preferably realized by means of the aforementioned external device, particularly a mobile device of the user, on which an app with a remote control function is installed. The manual remote control enables the user to dislodge the floor treatment apparatus from a stuck situation, to maneuver the floor treatment apparatus to a charging station or the like. In order to carry out a manual remote control, the user may, for example, initiate a remote control function on the mobile device. Alternatively, it is also possible that a manual remote control is directly enabled during and/or after the display of the partial sequence.

It is proposed that multiple options for a reaction to the environmental event and/or the apparatus condition are displayed on the screen, wherein the user subsequently selects at least one option. Consequently, options suitable for correcting the environmental event or the apparatus condition are suggested to the user. For example, the selected option may include a motion, function or activity of the floor treatment apparatus, which dislodges the floor treatment apparatus from a stuck position within the environment, brings about a charging process of a rechargeable battery of the floor treatment apparatus, eliminates an obstacle or the like. The options can be displayed on the screen of the floor treatment apparatus and/or an external device. The user particularly can click a button on the screen in order to execute an action corresponding to the selected option. For example, the displayed options, which can be selected by the user on the screen, may include "Manual Control of Floor Treatment Apparatus," "Deactivation of Shock Sensor," "Lower Brush," "Continue Cleaning," "Delete Error," and the like.

It is proposed that the user controls an apparatus action of the floor treatment apparatus in reaction to the displayed partial sequence. In this respect, the user may, for example, remotely control a traveling motion of the floor treatment apparatus, activate and/or deactivate a sensor of the floor treatment apparatus and/or an external sensor, activate a floor treatment element of the floor treatment apparatus and the like. The options of the control of the floor treatment apparatus by the user therefore not only include a mere maneuvering function of the floor treatment apparatus, but also options for controlling sensors and/or floor treatment elements such as brushes and the like, the use or non-use of which may have a supporting effect for the respective situation. The user can initially view the displayed partial sequence in order to comprehend the environmental event and/or the apparatus condition. Subsequently, the user can switch the floor treatment apparatus into a correction mode, in which the user can manually control the floor treatment apparatus. In this case, the control may include the displacement of obstacles by means of the floor treatment apparatus, wherein this preferably entails the deactivation of crash sensors of the floor treatment apparatus and the activation of drop-off sensors such that the floor treatment apparatus can travel against an interfering obstacle in order to displace this obstacle within the environment. In addition, a floor treatment element can be used for purposes other than its intended use. For example, a brush of the floor treatment apparatus can be slowly rotated opposite to a usual rotating direction during a floor treatment cycle such that the floor treatment apparatus can dislodge itself from a jammed position. In this case, jamming of the floor treatment apparatus could potentially also be detected based on a current measured on the drive of the brush. Furthermore, the floor treatment apparatus can be controlled in such a way that its previous direction of travel is reversed although the current detection range of the recording device or another sensor would usually not allow such a reverse motion. In this case, another sensor such as a distance sensor and/or a camera in a rear region of the floor treatment apparatus may be additionally activated. It would furthermore also be possible that the floor treatment apparatus is coupled to an external sensor provided in the environment of the floor treatment apparatus. The sensor may consist, for example, of a camera that is installed in the environment for room monitoring purposes.

It would furthermore be possible that the remote control of the floor treatment apparatus has to be enabled by means of an application of an external device. In this case, the application and the floor treatment apparatus are coupled by means of arbitrary encryption keys such that only these two components can communicate with one another. The transmission of the partial sequence of the recording to be displayed preferably takes place in encrypted form. Furthermore, the data communication service is in addition to the previous coupling protected with a password, e.g. a touch ID, such that the data communication service cannot be used if one of these components is lost. The manufacturer of the floor treatment apparatus or third persons basically are unable to utilize the display function in order to display the partial sequence.

It would be possible that a recording is recorded by means of the recording device and/or the environment is illuminated while an apparatus action is carried out. While controlling the floor treatment apparatus in order to correct the environmental event or the error condition of the apparatus, the user can monitor the floor treatment apparatus with the aid of a real-time recording of the environment and control the apparatus action. In this case, the environment can be additionally illuminated such that an optimal recording is obtained. For example, an LED or another lighting element of the floor treatment apparatus may be activated for this purpose.

It is proposed that the recording device records images in time intervals of approximately 0.1 to 5 seconds, wherein the images are assembled into an image sequence, and/or that the recording device records a video with an image frequency of approximately 1 image per second to 25 images per second. The recording device of the floor treatment apparatus therefore produces recordings of the environment in predefined intervals. If the recording consists of an image sequence, images can preferably be recorded in regular intervals, for example, of 0.5 seconds, 1 second, 2 seconds and, e.g., up to 5 seconds and subsequently assembled into a film-like sequence. Alternatively, the recording may consist of a video, the image frequency of which lies between approximately one image per second and up to 25 images per second. In this context, the indicated time intervals for the images of an image sequence and the image frequency of a video are merely cited as preferred examples and other time intervals and image frequencies may naturally also be used. In practical applications, however, the aforementioned time intervals and image frequencies proved particularly advantageous for presenting the situation prior to the occurrence of an error condition of the floor treatment apparatus to the user in an informative fashion—and with justifiable memory capacity.

It is proposed that the recording is stored for a time period of at least 5 seconds and up to 60 seconds. It is particularly preferred to extract a partial sequence, which comprises a time period, for example, of 5 seconds and up to 20 seconds prior to the occurrence of the environmental event or the apparatus condition, from the stored recording. The maximum partial sequence can correspond to the stored time period, e.g. up to 60 seconds. Older recordings are periodically overwritten or deleted such that the memory capacity is not exceeded.

In addition to the above-described method, the invention furthermore proposes a self-traveling floor treatment apparatus with a recording device for recording a recording of an environment of the floor treatment apparatus, which concerns a time period, and with an evaluation and control unit for storing the recording, wherein the control and evaluation unit is designed for subsequently extracting a time-defined partial sequence from the recording of the environment and for displaying this partial sequence on a screen in case of a defined environmental event and/or apparatus condition of the floor treatment apparatus.

The inventive self-traveling floor treatment apparatus is designed for carrying out an above-described method according to the invention. A situation within the environment of the floor treatment apparatus can be recorded by means of the recording device and partially extracted in case of an above-defined environmental event and/or apparatus condition of the floor treatment apparatus such that a defined partial sequence can be displayed on the screen. Based on this partial sequence, a user of the floor treatment apparatus can identify and rectify the error condition of the floor treatment apparatus, i.e. correct the environmental event or modify the apparatus condition of the floor treatment apparatus, such that an unobstructed and/or error-free operation of the floor treatment apparatus is possible. For this purpose, the floor treatment apparatus may also be communicatively linked with an external device of the user in the sense of a set consisting of a floor treatment apparatus and an external device, wherein the partial sequence can be displayed remotely from the floor treatment apparatus and the external device can also be used for remotely controlling the floor treatment apparatus. The screen of the external device or the screen of the floor treatment apparatus may be designed for displaying multiple options for a reaction to the environmental event or the apparatus condition. A user can select an option by pressing a displayed button or the like and thereby initiate an action corresponding to the selected option. In this case, an evaluation and control unit of the floor treatment apparatus may be designed for controlling an apparatus action of the floor treatment apparatus, e.g. for controlling a traveling motion of the floor treatment apparatus, for activating and/or deactivating a sensor of the floor treatment apparatus and/or an external sensor and/or for activating a floor treatment element of the floor treatment apparatus such as a brush or the like. The recording device is preferably designed for recording images in certain time intervals and/or for recording a video, as well as for storing this recording for a predefined time period such that a partial sequence can be extracted therefrom.

In other respects, the characteristics described above with reference to the method for operating a floor treatment apparatus also apply to the design of such a self-traveling floor treatment apparatus.

The self-traveling floor treatment apparatus may consist, for example, of a cleaning apparatus such as a vacuum robot and/or a wiping robot. It may naturally also consist of a different floor treatment apparatus such as a polishing apparatus or a grinding apparatus, as well as of a mowing robot or the like.

BRIEF DESCRIPTION OF THE DRAWINGS

The invention is described in greater detail below with reference to exemplary embodiments. In the drawings:

FIG. 3 shows the environment of the floor treatment apparatus during a later point in time, FIG. 4 shows an external mobile device with a screen, on which images of a partial sequence are displayed, and FIG. 5 shows the mobile external device with suggested options.

DESCRIPTION OF THE EMBODIMENTS

Figure 1:
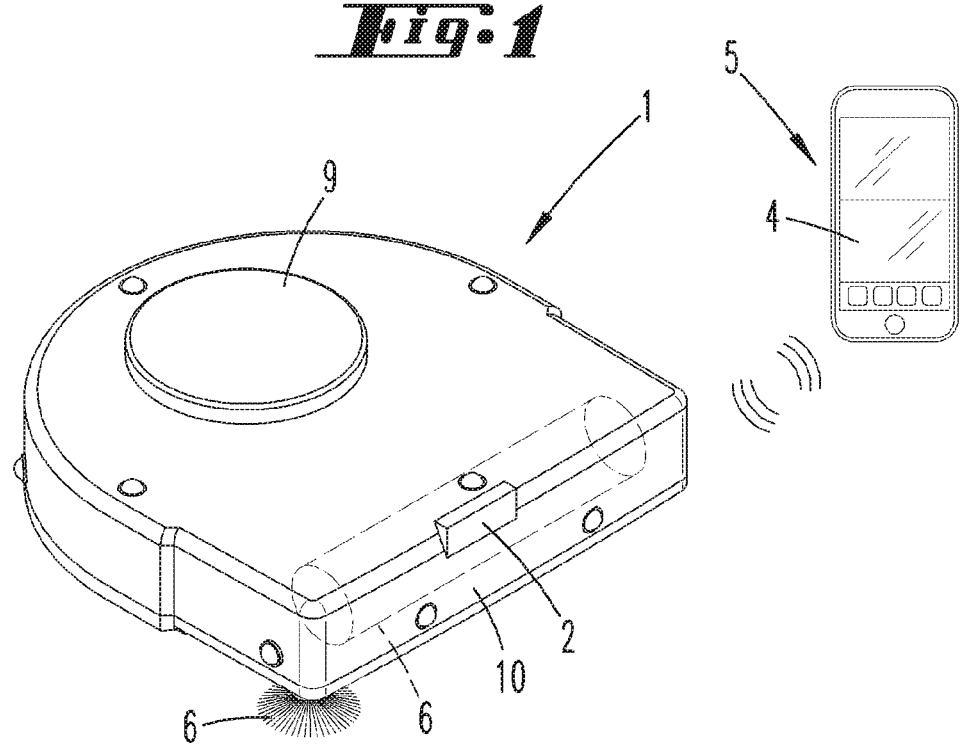
FIG. 1 shows an inventive self-traveling floor treatment apparatus.

FIG. 1 shows a floor treatment apparatus 1, which in this case is realized in the form of a vacuum robot. The floor treatment apparatus 1 features a navigation and self-localization unit, with the aid of which the floor treatment apparatus 1 can travel by itself within an environment 3. The navigation and self-localization unit comprises a distance measuring device 9, in this case, for example, a (not-shown) triangulation measuring device, by means of which distances from obstacles 7 and walls 8 within the environment 3 of the floor treatment apparatus 1 can be measured. In addition, the navigation and self-localization unit usually also comprises a (not-shown) odometric measuring device, which is assigned to a wheel of the floor treatment apparatus 1 and measures a distance traveled.

The floor treatment apparatus 1 shown furthermore features multiple floor treatment elements 6 that serve for treating a surface to be cleaned, namely a lateral brush, which laterally protrudes from underneath a housing of the floor treatment apparatus 1 and particularly serves for cleaning transitions between a surface and a wall 8 of the environment 3, as well as a floor treatment element 6 in the form of a bristle roller, which is located underneath the floor treatment apparatus 1 (illustrated with broken lines) and serves for acting upon a surface to be cleaned. The floor treatment apparatus 1 furthermore features a recording device 2, which in this case consists of a camera that can record images of the environment 3 in defined time intervals.

The floor treatment apparatus 1 also features a bumper 10 that is formed along a circumferential section of the housing of the floor treatment apparatus 1. The bumper 10 is connected to a contact sensor that can detect shocks upon the bumper 10. A not-shown control and evaluation unit of the floor treatment apparatus 1 controls the floor treatment apparatus 1 within the environment 3 in such a way that a floor treatment activity, in this case cleaning of a floor area, can be carried out. The control and evaluation unit furthermore controls the recording device 2, the floor treatment element 6, as well as the distance measuring device 9.

The floor treatment apparatus 1 has a data communication link with an external mobile device 5, which in this case consists of a smartphone. The mobile device 5 features a screen 4 in the form of a touchscreen. In this case, the floor treatment apparatus 1 and the mobile device 5 are wirelessly linked to one another. For example, the mobile device 5 and the floor treatment apparatus 1 are connected to a home network of the user.

Figure 2:
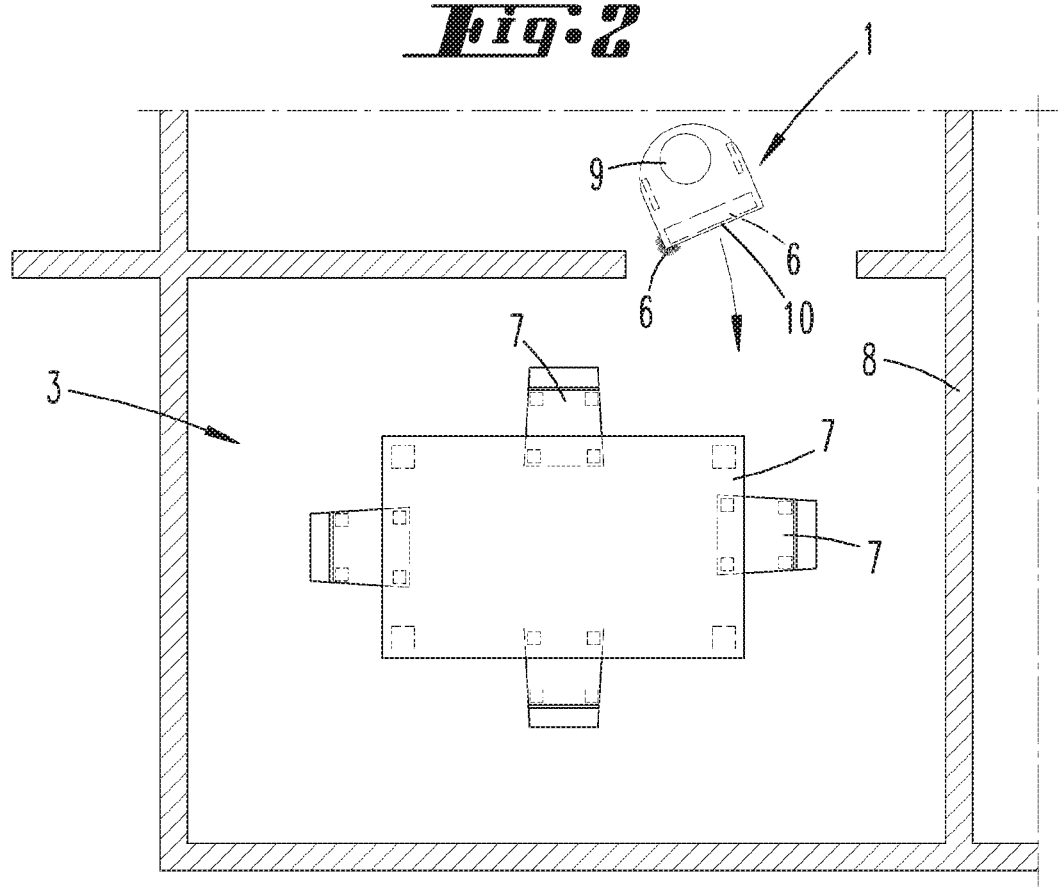
FIG. 2 shows an environment of the floor treatment apparatus during a first point in time.

FIGS. 2 and 3 respectively show a spatial situation of an environment 3, in which the floor treatment apparatus 1 is located, at two different points in time. The environment 3 contains a plurality of obstacles 7, as well as walls 8 that define the environment 3. In this case, the obstacles 7 consist of a seating area with a table and four chairs.

According to the situation illustrated in FIG. 2, the floor treatment apparatus 1 travels into a room of the environment 3 and steers toward the obstacles 7 in order to clean a floor area underneath the table. Although the floor treatment apparatus 1 and the obstacles 7 are not illustrated true-to-scale for reasons of presentation, the functionality of the described method is thereby not restricted in any way.

In the situation illustrated in FIG. 3, the floor treatment apparatus 1 has reached a region underneath an obstacle 7, namely underneath the table of the seating arrangement. In the process, the floor treatment apparatus 1 simultaneously encounters multiple obstacles 7, namely two chair legs and one table leg. The floor treatment apparatus 1 becomes jammed between these obstacles 7 such that the floor treatment apparatus 1 can no longer dislodge itself from this situation. An error, in which the apparatus condition is a jammed condition, therefore occurs during the operation of the floor treatment apparatus 1.

During the progressive motion of the floor treatment apparatus 1, the recording device 2, i.e. the camera of the floor treatment apparatus 1, has recorded images of the environment 3 from the perspective of the floor treatment apparatus 1 in time intervals, e.g., of 0.5 seconds and stored the recorded images in a memory. In this case, the images are stored within the memory for 30 seconds and overwritten with newly recorded images after the expiration of these 30 seconds. In the jammed apparatus condition of the floor treatment apparatus 1 according to FIG. 3, the control and evaluation unit of the floor treatment apparatus 1 transmits a message, which contains information on the current position of the floor treatment apparatus 1 within the environment 3, as well as a partial sequence of the stored images, to the mobile device 5 of the user. In this case, the partial sequence of the recording is limited to the last 30 seconds prior to the occurrence of the error, i.e. it corresponds to the time period, of which images still exist within the memory. It would likewise be possible to define and extract a partial sequence, which is shorter than the maximum available stored time period prior to the occurrence of the error. The control and evaluation unit transmits the images to an app installed on the mobile device 5, where these images are assembled into an image sequence and displayed to the user on the screen 4 of the mobile device 5. In case of an error, the display can either be initiated automatically or upon the request of a user.

FIG. 4 shows the exemplary display of two images of an image sequence on the screen 4 of the mobile device 5. In practical applications, the image sequence preferably comprises a larger number of images. It is alternatively advantageous to display a video that is assembled of multiple images. The image sequence or the video respectively provides the user of the floor treatment apparatus 1 with information on how the floor treatment apparatus 1 could have ended up in the jammed situation. The user receives information on the traveling direction shortly before the occurrence of the error, as well as on the obstacles 7 surrounding the floor treatment apparatus 1.

After the complete image sequence or video has been played back, multiple options 11 are displayed on the screen 4 of the mobile device 5. These options 11 are illustrated in FIG. 5. The options 11 comprise a selection of actions, which the floor treatment apparatus 1 can carry out in order to rectify the error condition. The options illustrated in FIG. 5 should not be interpreted in a restrictive sense, but rather merely describe one possible selection. It goes without saying that other options 11 may also be provided.

In this case, the options 11 include a manual control of the floor treatment apparatus 1, the deactivation of a shock sensor of the floor treatment apparatus 1, which is arranged behind the bumper 10, lowering of a floor treatment element 6 of the floor treatment apparatus 1, namely lowering of a brush, the continuation of the cleaning cycle by means of the floor treatment apparatus 1, as well as the deletion of the error from the evaluation and control unit such that the user can, for example, manually dislodge the floor treatment apparatus 1 from the stuck situation between the obstacles 7 and carry the floor treatment apparatus to a different location.

In this example, the user selects, for example, the options "Deactivate Shock Sensor" and "Continue Cleaning." Subsequently, the control and evaluation unit deactivates the shock sensor of the floor treatment apparatus 1 and prompts the floor treatment apparatus 1 to continue the cleaning cycle. The floor treatment apparatus 1 now travels against the obstacles 7, but since the contact sensor assigned to the bumper 10 is deactivated, the floor treatment apparatus 1 does not perceive the obstacles 7 as such and travels in a forward direction such that one of the obstacles 7, in this example a chair, is displaced and the floor treatment apparatus 1 can dislodge itself from the stuck situation. The cleaning cycle is then automatically continued, wherein the floor treatment apparatus 1 may follow a traveling route specified by the navigation and self-localization unit.

Alternatively to the above-described options 11, it would also be possible that the user selects the option 11 "Manual Control," wherein the screen 4 of the mobile device 5 then shows a display, in which the user can manually control the floor treatment apparatus 1, e.g. by actuating "up," "down," "right" and "left" arrows displayed on the screen 4. These arrows enable the user to dislodge the floor treatment apparatus 1 from the jammed position, e.g. rearward. During the manual control, the recording device 2 preferably continues to make recordings of the environment 3. These recordings may be displayed in the form of live images or a live video. In addition, a lighting element may illuminate the environment 3.

It would furthermore be possible that the user selects the option 11 "Lower Brush," whereupon the floor treatment apparatus 1 is tilted toward the surface to be cleaned and can slide past an obstacle 7 with a corner region of its housing in order to carry out a progressive motion in the forward direction. It would likewise be possible to simply delete an error message within the evaluation and control unit by selecting the option 11 "Delete Error." In this case, the user picks up the floor treatment apparatus 1, e.g. from the wedged situation, and places it on a clear surface of the environment 3.

LIST OF REFERENCE SYMBOLS

1 Floor treatment apparatus
2 Recording device
3 Environment
4 Screen
5 Mobile device
6 Floor treatment element
7 Obstacle
8 Wall
9 Distance measuring device
10 Bumper
11 Option

What is claimed is:

1. A method for operating a self-traveling floor treatment apparatus, the method comprising:
    defining by a user prior to operating the self-traveling floor treatment apparatus apparatus conditions as error conditions of the self-traveling floor treatment apparatus,
    wherein the apparatus conditions comprise jamming of the self-travelling floor treatment apparatus in the environment, or blocking of a driving wheel of the floor treatment apparatus,
    recording using a camera of the self-traveling floor treatment apparatus an environment of the self-traveling floor treatment apparatus, wherein the recording concerns a time period,
    displaying the recording for a user of the self-traveling floor treatment apparatus on a screen,
    storing the recording,
    determining by a controller of the self-traveling floor treatment apparatus an error condition of the self-traveling floor treatment apparatus according to the error conditions previously defined by the user,
    subsequently extracting, by the controller of the self-traveling floor treatment apparatus, in case of one of the apparatus conditions of the self-traveling floor treatment apparatus, a time-defined partial sequence from the recording that is stored and displayed on the screen,
    wherein the extracted partial sequence contains a certain time segment prior to occurrence of the error condition of the self-traveling floor treatment apparatus to obtain information on a situation to which the self-traveling floor treatement apparatus was exposed prior to the error condition, wherein the extracted partial sequence is shorter than a maximum available stored time period prior to the occurrence of the error, and wherein the self-travelling floor treatment apparatus has a direct data communication link with an external mobile device having an application installed thereon and a display, wherein the partial sequence is purposefully retrieved via the application in such a way that the display of the partial sequence is always automatically displayed when an error condition of the self-travelling floor treatment apparatus has occurred,
    controlling by the user an apparatus action of the self-travelling floor treatment apparatus in reaction to display of the time defined partial sequence, wherein the user remotely activates and/or deactivates a sensor of the self-travelling floor treatment apparatus or an external sensor, or activates a floor treatment element of the self-travelling floor treatment apparatus for purposes other than its intended use, in order to dislodge the floor treatment apparatus from a stuck situation, displaying on the screen multiple options for a reaction to the defined apparatus condition, wherein the user subsequently selects at least one option, wherein the multiple options are displayed in the form of buttons on the screen, and executing an action of the self-traveling floor treatment apparatus corresponding to a selected option by clicking on one of the buttons, the displayed options of the buttons including at least one of: deactivation of a shock sensor, or lowering a brush element of the self-traveling floor treatment apparatus so as to cause self-traveling floor treatment apparatus to rectify the error condition.

2. The method according to claim 1, wherein the defined apparatus condition occurs when planned progressive motion of the self-traveling floor treatment apparatus is interrupted or stopped.

3. The method according to claim 1, wherein the time-defined partial sequence is displayed on a screen of an external mobile device.

4. The method according to claim 1, wherein the user remotely controls the self-traveling floor treatment apparatus manually after display of the time-defined partial sequence.

5. The method according to claim 1, the environment is illuminated while an apparatus action is carried out.

6. The method according to claim 1, wherein the camera records images in time intervals of approximately 0.1 to 5 seconds, wherein the images are assembled into an image sequence, and/or wherein the camera records a video with an image frequency of 1 image per second to 25 images per second.

7. The method according to claim 1, wherein the recording is stored for a time period of at least 5 seconds and up to 60 seconds.

8. A self-traveling floor treatment apparatus with a camera for recording an environment of the self-traveling floor treatment apparatus, which concerns a time period, and with a computer for storing the recording, wherein the computer is designed for storing user-defined apparatus conditions as error conditions of the self-traveling floor treatment apparatus prior to operating the self-traveling floor treatment apparatus, wherein the apparatus conditions comprise jamming of the self-travelling floor treatment apparatus in the environment, blocking of a driving wheel of the floor treatment apparatus, subsequently extracting a time-defined partial sequence from the recording of the environment and for displaying this partial sequence on a screen in case of one of the apparatus conditions of the self-traveling floor treatment apparatus, and further comprising a controller that is configured to determine an error condition of the self-traveling floor treatment apparatus, and subsequently extract, in case of a defined apparatus condition of the self-traveling floor treatment apparatus, a time-defined partial sequence from the recording that is stored and displayed on the screen, wherein the extracted partial sequence contains a certain time segment prior to occurrence of the error condition of the self-traveling floor treatment apparatus to obtain information on a situation to which the self-traveling floor treatement apparatus was exposed prior to the error condition, wherein the extracted partial sequence is shorter than a maximum available stored time period prior to the occurrence of the error, wherein the self-travelling floor treatment apparatus has a direct data communication link with an external mobile device and wherein an application installed on the external mobile device allows a purposeful retrieval of the partial sequence in such a way that the display of the partial sequence is always automatically displayed when an error condition of the self-travelling floor treatment apparatus has occurred, wherein the apparatus is configured such that defined apparatus conditions, which lead to the display of a partial sequence on the screen, can be defined by the user of the floor treatment apparatus, wherein the user controls an apparatus action of the self-travelling floor treatment apparatus in reaction to display of the time defined partial sequence, wherein the apparatus is configured such that the user remotely activates or deactivates a sensor of the self-travelling floor treatment apparatus or an external sensor, or activates a floor treatment element of the self-travelling floor treatment apparatus for purposes other than its intended use, in order to dislodge the floor treatment apparatus from a stuck situation, wherein the screen is configured to display multiple options in the form of buttons on the screen for a reaction to the defined apparatus condition for selection of at least one option by the user, and the screen is further configured to execute an action of the self-traveling floor treatment apparatus corresponding to a selected option by the user clicking one of the buttons, the displayed options of the buttons including at least one of deactivation of a shock sensor, or lowering a brush element of the self-traveling floor treatment apparatus so as to cause self-traveling floor treatment apparatus to rectify the error condition.

* * * * *